United States Patent
Welch et al.

(10) Patent No.: US 6,211,120 B1
(45) Date of Patent: Apr. 3, 2001

(54) APPLICATION OF ALUMINUM CHLOROHYDRATE IN VISCOSIFYING BRINE FOR CARRYING PROPPANTS IN GRAVEL PACKING

(75) Inventors: John Charles Welch, Spring; Allen Gabrysch; Benn Voll, both of Houston; Brett Collins, Kingwood; Michael A. Jarrett; Cedric Nix, both of Houston, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/247,168

(22) Filed: Feb. 9, 1999

Related U.S. Application Data

(60) Provisional application No. 60/075,112, filed on Feb. 11, 1998.

(51) Int. Cl.$^7$ .............................. C09K 7/02; E21B 43/29

(52) U.S. Cl. ...................... 507/270; 507/140; 507/143; 507/269; 166/270.1; 166/305.1

(58) Field of Search ................................... 252/143, 270; 166/270.1, 305.1; 507/269, 140, 143, 270

(56) References Cited

U.S. PATENT DOCUMENTS

| | | | |
|---|---|---|---|
| 3,884,302 | * 5/1975 | Messenger | 166/291 |
| 3,954,627 | 5/1976 | Dreher et al. | 507/209 |
| 4,008,766 | * 2/1977 | Savins | 166/273 |
| 4,021,356 | 5/1977 | Kudchadker et al. | 252/8.55 D |
| 4,468,334 | 8/1984 | Cox et al. | 252/8.5 C |
| 4,541,485 | 9/1985 | Block | 166/281 |
| 4,635,727 | * 1/1987 | Anderson et al. | 166/308 |
| 4,646,834 | 3/1987 | Bannister | 166/291 |
| 5,052,486 | * 10/1991 | Wilson | 166/250 |

(List continued on next page.)

FOREIGN PATENT DOCUMENTS 0835983   4/1998  (EP) .

OTHER PUBLICATIONS

W. L. Nehmer, "Viscoelastic Gravel–Pack Carrier Fluid," SPE Formation Damage Control Symposium, Feb. 8–9, 1988, pp. 217–220.

Albright & Wilson, "Novel Water Based Drilling Fluids Using Structured Liquid Technology," Apr. 27, 1992.

B. R. Stewart, et al., "Use of a Solids–free Viscous Carrying Fluid in Fracturing Applications: An Economic and Productivity Comparison in Shallow Completions," European Formation Damage Control Conference, May 15–17, pp. 379–385.

J. L. Elbel, et al., "Production Effects of Fluid Loss in Fracturing High–Permeability Formations," European Formation Damage Control Conference, May 15–16, 1995, pp. 201–207.

*Primary Examiner*—Arlen Soderquist
*Assistant Examiner*—LaToya I. Cross
(74) *Attorney, Agent, or Firm*—Madan, Mossman & Sriram, P.C.

(57) ABSTRACT

New compositions have been discovered which are useful as slurry concentrates to carry solid particles along in a fluid. A non-limiting example would be to carry proppants in a concentrate to a completion fluid being pumped downhole in a hydrocarbon recovery operation. The composition employs both a trivalent salt, such as aluminum chlorohydrate, as a viscosifying agent, and a surfactant. Surprisingly, it has been discovered that a synergistic effect is present between the aluminum chlorohydrate and the surfactant in that less of each component is required when both are used together to suspend the same amount of solids, than if one or the other is used separately. The viscoelasticity of the concentrate may be easily broken by dilution; other mechanisms are also anticipated.

17 Claims, 2 Drawing Sheets

Schematic of return permeability testing to evaluate the effect of brine/additive on filtercake.

U.S. PATENT DOCUMENTS

| | | | | |
|---|---|---|---|---|
| 5,105,885 | * | 4/1992 | Bray et al. | 166/279 |
| 5,211,859 | * | 5/1993 | Horton et al. | 507/129 |
| 5,232,621 | | 8/1993 | Dixit et al. | 252/174.23 |
| 5,360,558 | * | 11/1994 | Pakulski et al. | 507/129 |
| 5,497,831 | * | 3/1996 | Hainey et al. | 166/308 |
| 5,518,996 | * | 5/1996 | Maroy et al. | 507/100 |
| 5,576,271 | * | 11/1996 | Patel | 507/110 |
| 5,654,261 | * | 8/1997 | Smith | 507/269 |
| 5,662,168 | * | 9/1997 | Smith | 166/295 |
| 5,799,734 | | 9/1998 | Norman et al. | 166/278 |
| 5,924,488 | * | 7/1999 | Nguyen et al. | 166/280 |

* cited by examiner

Schematic of return permeability testing to evaluate the effect of brine/additive on filtercake.

APPLICATION OF ALUMINUM CHLOROHYDRATE IN VISCOSIFYING BRINE FOR CARRYING PROPPANTS IN GRAVEL PACKING

This application claims the benefit of U.S. Provisional Application No. 60/075,112 filed Feb. 11, 1998.

FIELD OF THE INVENTION

The present invention relates to media for carrying proppants, gravels and other solids during petroleum recovery operations, and more particularly relates, in one embodiment, to using aluminum chlorohydrate in slurries for carrying proppants, gravels and other solids during petroleum recovery operations.

BACKGROUND OF THE INVENTION

It is well known that solid particles, such as proppants and gravels, must be transported during oil field production. In the case of proppants, the proppants may be delivered to a hydrocarbon recovery zone to prop open fractures in the formation to facilitate recovery of hydrocarbons. Horizontal wells drilled and completed in unconsolidated sand reservoirs have become feasible recently, due to new technology and completion methods. Wells of this type require sand control, for example such as long open hole gravel packs or the installation of mechanical sand exclusion devices (slotted liners, prepacked screens, etc.). Successful wells have been completed with horizontal, producing intervals as long as 4,000 ft. (1,220 m) using these methods of sand control.

Usually the wells are drilled with conventional drilling muds to the top of the pay zone and casing is set. The cement is then drilled out to the casing shoe and the shoe is tested. The drilling mud is then displaced with a "low damage potential drilling fluid" generally consisting of polymers, viscosity enhancers and particles for building a filter cake. The particles are usually graded salt (NaCl) or graded calcium carbonate ($CaCO_3$). These compounds are used because they are soluble in undersaturated brines or hydrochloric acid.

After the open hole interval has been drilled to total depth, the gravel pack screen or sand exclusion device is placed in the open hole interval. To do this it becomes necessary to circulate the drilling fluid from the open hole so that the well can be gravel packed or the sand exclusion setting can be tested. Displacement of the drilling fluid with a solids-containing completion brine may be necessary. Concern about the physical erosion of the filter cake with the completion fluid is also always an issue. That is, the completion brine should not damage the filter cake to permit the completion or other operation to take place and protect the well bore during the entire operation.

Polymers have been used in the past as viscosifiers in completion fluids to carry or suspend solid particles in the brine. However, such polymers require separate breaker compositions to be injected to reduce the viscosity. Further, such polymers tend to leave a coating on the proppant even after being broken, which coating may interfere with the functioning of the proppant. Studies have shown that "fish-eyes" and/or "microgels" present in some polymer gelled carrier fluids will plug pore throats, leading to impaired leakoff and causing formation damage.

Further, because such completion fluids contain solid particles, there is concern that the solids will damage the existing rig pumps at the drilling site. Thus, separate pumps must be brought in and employed to pump the completion fluid down hole. Fracturing treatments using solids-free viscoelastic surfactant fluids are known, however, proppants would have to be delivered in a separate procedure. Viscoelastic surfactant-based gelled gravel carrier fluids are also known.

It would be desirable if a composition and method could be devised to overcome some of the problems in the conventional injection of solids-carrying completion fluids.

SUMMARY OF THE INVENTION

Accordingly, it is an object of the present invention to provide a method to allow proppant used in gravel packing and other solid particles to be delivered in a concentrated slurry to a carrier fluid to facilitate handling the proppant.

It is another object of the present invention to provide a composition and method which permits metering of the proppant into a carrier fluid.

Still another object of the invention is to permit use of existing equipment on site for transporting the solid particles, such as proppant.

In carrying out these and other objects of the invention, there is provided, in one form, a pumpable viscoelastic slurry concentrate for carrying solid particles, where the composition has a brine base fluid, a trivalent salt (e.g. aluminum chlorohydrate) as a viscosifying agent, a surfactant, and an alkaline agent in an amount effective to initiate viscosifying.

DETAILED DESCRIPTION OF THE INVENTION

Figure 1:
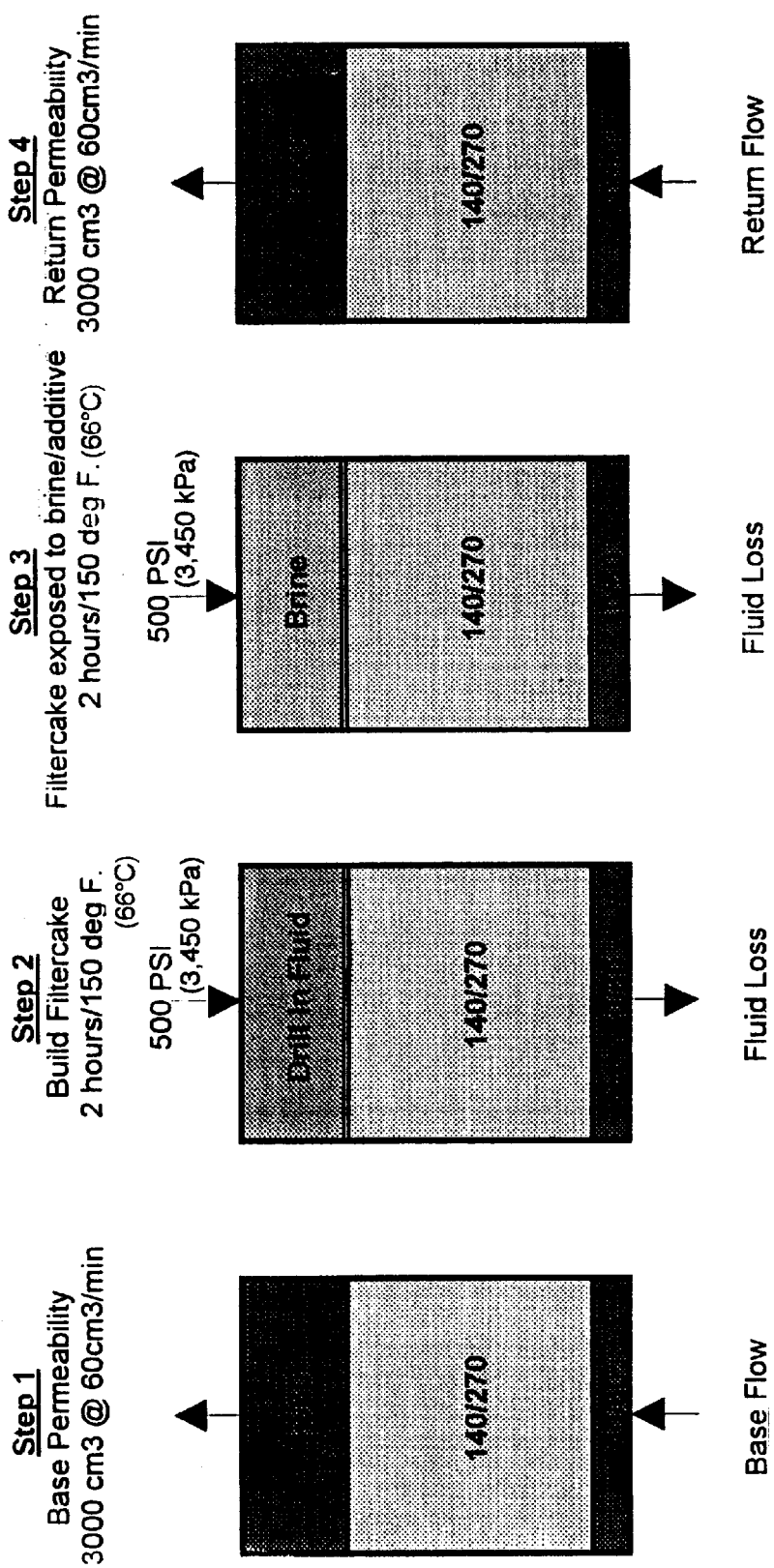
FIG. 1 is a schematic of return permeability testing to evaluate the effect of brine/additive on filter cake.

New compositions have been discovered which are useful as pumpable viscoelastic slurry concentrates to carry solid particles along in a fluid. A non-limiting example would be to carry proppants in a concentrate to a completion fluid being pumped downhole in a hydrocarbon recovery operation. The composition employs both a trivalent salt as a viscosifying agent, and a surfactant. Surprisingly, it has been discovered that a synergistic effect is present between the trivalent salt (e.g. aluminum chlorohydrate) and the surfactant in that less of each component is required when both are used together to suspend the same amount of solids, than if one or the other is used separately.

In a preferred embodiment of the invention, a pumpable viscoelastic slurry concentrate for carrying solid particles is made using a brine base fluid, a trivalent salt as a viscosifying agent, a surfactant, and an alkaline agent in an amount effective to initiate viscosifying or viscosification. Typically, this occurs by making the pH more neutral. A preferred trivalent salt, aluminum chlorohydrate, $[Al_2(OH)_5Cl]_x$, has not previously been known to be useful as a viscosifying agent to help suspend solids in a slurry or slurry concentrate. In one embodiment of the invention, the trivalent salt is present in the total slurry concentrate in a proportion ranging from about 0.1 to about 90 volume %; in another embodiment from about 1 to about 25 volume %; preferably from about 1 to about 10 volume %; and most preferably from about 1 to about 5 volume %.

The brine base fluid may be any brine, conventional or to be developed which serves as a suitable media for the various concentrate components. As a matter of convenience, the brine base fluid may be the brine available at the site used in the completion fluid, for a non-limiting example.

A surfactant is required to form a stable composition. Additionally, without a surfactant, so much aluminum chlorohydrate would have to be used that the fluid would be expensive, probably corrosive, and have shear thinning properties that may be acceptable, but which may not be as optimum as in the synergistic blend. Surfactants suitable for use in the present invention include, but are not necessarily limited to those having a hydrophilic/lipophilic balance of between about 12–19, preferably a HLB of between about 15–19. Such surfactants include, but are not necessarily limited to ethoxylated fatty alcohols, such as oleyl alcohol ethoxylate; alkoxylated fatty oils, such as ethoxylated vegetable oils, e.g. ethoxylated castor oil; ethoxylated alcohols, such as ethoxylated isotridecyl alcohols; ethoxylated fatty acids; ethylene oxide/propylene oxide block copolymers; and ethoxylated esters, such as polyethylene glycol esters and ethoxylated sorbitol esters. Certain esters, including but not necessarily limited to sorbitol esters and phosphate esters, are effective without ethoxylation. Preferred surfactants are non-toxic. It is also preferred that the surfactant is an alkoxylated fatty alcohol or alkoxylated fatty oil. A most preferred surfactant is ethoxylated castor oil. The foregoing surfactants are widely available from a variety of commercial sources.

The surfactant aids the aluminum chlorohydrate to keep the solid particles in suspension in the slurry concentrate. Another characteristic contributed by these surfactants is the phenomenon of coacervation and gel formation in the brine, which has been extensively studied. Although the molecular interactions vary from system to system, coacervation of the surfactants is usually accompanied by a strong adsorption of counterions. The viscoelastic gels represent agglomerations of very long, rod-like micelles which are formed by transformation of the smaller, spherical, lamellar or double layer micelles. A "salting-in" phenomenon occurs with surfactants in brine salts of Ca, Mg, Al and Li. This effect is due to a coordination of the hydrated metallic cation with the ether oxygen atoms forming crystalline complexes.

Although slurries can be formed by using surfactants alone and trivalent salt alone, it has been surprisingly discovered that the use of both together can achieve a slurry with the same solids content, but reduced amounts of both the aluminum chlorohydrate and the surfactant. A viscoelastic fluid results from the presence of these components in effective amounts. In one non-limiting embodiment of the invention, optimum rheological benefits in building a viscoelastic slurry fluid is achieved when using 1–5% by volume alkoxylated surfactant, 1–5% by volume aluminum chlorohydrate and 1–5 lb/bbl alkaline agent.

In one embodiment of the invention, the surfactant is present in the total slurry concentrate in a proportion ranging from about 0.1 to about 90 volume %; in another embodiment from about 0.1 to about 50 volume %; preferably from about 1 to about 10 volume %; and most preferably from about 1 to about 5 volume %.

The alkaline agent may be any suitable basic compound to neutralize the slurry concentrate, i.e. shift the pH to or toward about 7, in an effective amount therefor. This initiates viscosifying (viscosification). Suitable alkaline agents for use in the compositions and methods of this invention include but are not necessarily limited to, caustic (sodium hydroxide, NaOH), potassium hydroxide (KOH), ammonium hydroxide ($NH_4OH$), magnesium oxide (MgO), and the like.

The proppant, solid particle or gravel may be any solid particulate matter suitable for its intended purpose, for example as a screen or proppant, etc. Suitable materials include, but are not necessarily limited to sand, sintered bauxite, sized calcium carbonate, sized salts, ceramic beads, and the like, and combinations thereof. The proportion of solid particles in the pumpable viscoelastic slurry concentrate may range from about 0.1 to about 26 pounds per gallon (ppg) (12.0 to 3,120 $kg/m^3$), preferably from about 0.1 to about 18 ppg (12.0 to 2,160 $kg/m^3$), in one embodiment from about 1 to about 18 ppg (120 to 2,160 kg/ $m^3$), and most preferably from about 15 to about 18 pounds per gallon (1,800 to 2,160 $kg/m^3$).

A basic method is to inject the proppant into the carrier fluid or completion brine downstream from the conventional pumps which are delivering the gravel packing fluid. To do this, the proppant is suspended in the form of a slurry in the viscosified brine. The proppant is thus delivered by a small injection pump to the carrier fluid at an injection point downstream from the pumps used to transport the gravel packing fluid.

Figure 2:
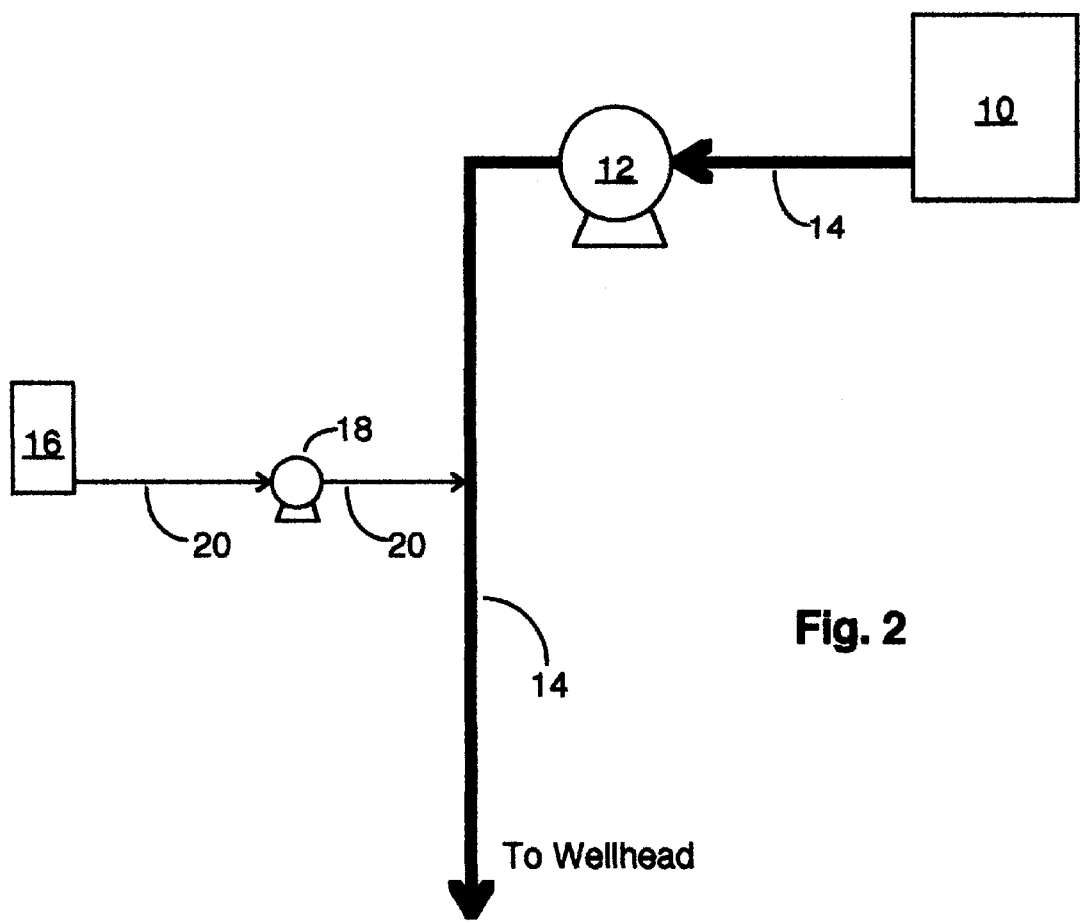
FIG. 2 is a schematic illustration of the apparatus used in practicing the method of injecting the pumpable viscoelastic slurry of this invention.

In one non-limiting practice, the pumpable viscoelastic slurry concentrate is formulated without the solid particles, which are added later. It is contemplated that the pumpable viscoelastic slurry concentrate may be marketed with or without solid particles. In any event, the pumpable viscoelastic slurry concentrate is transported to the well site. Since it is a concentrate, transportation costs can be greatly reduced. If no solid particles are present, they are added at the site. Shown in FIG. 2 is a schematic illustration of the apparatus used in practicing the method of injecting the pumpable viscoelastic slurry of this invention including a completion fluid storage tank 10 from which completion fluid is pumped by rig pump 12 via pipe 14 to the wellhead. The pumpable viscoelastic slurry concentrate is held in slurry storage tank 16 and injected into pipe 14 by injection pump 18 via line 20. Slurry storage tank 16, injection pump 18 and line 20 can be considerably smaller than completion fluid storage tank 10, rig pump 12 and pipe 14, respectively, since the slurry is concentrated, and its injection into the completion fluid can be carefully metered. Other methods of injecting the slurry concentrate and incorporating the proppant are expected to be useful.

Although solids-containing fluids are preferred not to be pumped through rig pumps for danger of damaging the pumps, because the method of this invention employs a viscoelastic concentrate, all that needs to be provided to implement the invention in one embodiment is injection pump 18; rig pump 12 is used conventionally to transport the completion fluid to the wellhead, but the concentrate is injected at some intermediate point between rig pump 12 and the wellhead. The slurry concentrate is immediately diluted and shear thinned by the much greater volume of the completion fluid, and immediately the viscoelastic properties of the concentrate are lost, but this is as it should be. Because the viscoelastic concentrate is in pumpable, fluid form, there is no difficulty with it immediately mixing into the carrier fluid, such as the completion fluid. The compositions and methods of this invention are quickly and easily and completely mixed using conventional equipment. That is, the physical form of the viscoelastic concentrate facilitates the handling and metering of the proppant. In one non-limiting example for illustration only, the slurry concentrate may have 15 pounds per gallon (ppg) (1,800 kg/m$^3$) of sand, whereas the carrier fluid may have only 1 ppg (120 kg/m$^3$).

It is anticipated that the viscoelastic slurry concentrate may be broken, that is, to no longer be a viscoelastic slurry by a mechanism other than dilution and mixing with another fluid (or more of the same base fluid, e.g. brine). For example, such a mechanism may include, but is not necessarily limited to pH adjustment (shifting pH to acid or base), pressure adjustment, temperature adjustment, catalyst or other added reactive agent, and the like.

The invention will now be further illustrated by the following non-limiting Examples. Testing has identified pumpable viscoelastic slurry concentrates using surfactant technology in brines to suspend gravel pack sand. One system was based on 13.5 ppg (1,620 kg/m$^3$) calcium chloride/calcium bromide (Table II: Fluids "J" through "P" and "Z" through "BB"), and the other was based on 11.6 ppg calcium chloride (Table I: Fluids "A" through "I", and "Q" through "T"). A third system was based on 11.7 ppg (1,390 kg/m$^3$) sodium bromide (Table III: Fluids "U" through "Y").

The sodium bromide fluids failed to provide good viscoelastic properties when treated with a surfactant; detrimental foaming was also evident. Surfactant applications in divalent salt brines are preferred. A system based on EXP-42 showed the most promise. Addition of aluminum chlorohydrate was found to synergistically enhance the characteristics of the carrier fluid. These fluids were tested with 15 pounds of proppant added per gallon (ppg) (1,800 kg/m$^3$). Sandpack return permeability tests indicate that these fluids have a benign impact on PERFFLOW® filter cake when diluted with gravel packing fluid.

Screening Tests

A search was made for a system with a high 10 minute gel. High gel strengths are indicative of good suspension properties. Tested formulas are given in Data Tables I, II and III. All percentages are volume %. During this testing, it was discovered that adding aluminum chlorohydrate to the formulation greatly enhanced good gel strength numbers. Compare, for example, the results of Fluid E with those of Fluid G1.

DATA TABLE I

Gravel Pack Structured Fluid Study in 11.6 lb/gal (1,390 kg/m$^3$) CaCl$_2$

| Materials | A | B | C | D | E | F | G | G1** | H | I | O | R | S | T |
|---|---|---|---|---|---|---|---|---|---|---|---|---|---|---|
| 11.6 lb/gal (1,390 kg/m$^3$) CaCl$_2$ | 0.95 (151 1) | 0.90 (143 1) | 0.95 (151 1) | 0.90 (143 1) | 0.975 (155 1) | 0.95 (151 1) | 0.95 (151 1) | 0.95 (151 1) | 0.95 (151 1) | 0.95 (151 1) | 0.95 (151 1) | 0.97 (154 1) | 0.955 (152 1) | 0.955 (152 1) |
| DFE-705% | 5 | 10 | — | 10 | — | — | — | — | 2.5 | — | — | — | — | — |
| EXP-42, % | — | — | 5 | — | 2.5 | 2.5 | 2.5 | 2.5 | — | — | 2.5 | 1.5 | 1.5 | 2.0 |
| BPCI MO-2675, % | — | — | — | — | — | — | — | — | — | 2.5 | — | — | — | — |
| Product I.D. No. 1889, lb | 2 (908 g) | 2* (908 g) | 3 (1362 g) | 3 (1362 g) | 1 (454 g) | | 1 (454 g) | 1 (454 g) | 0.5 (227 g) | 0.5 (227 g) | — | — | — | — |
| LD-8, lb | — | — | — | — | — | 0.3 (136 g) | — | — | — | — | 0.3 (136 g) | 0.3 (136 g) | 0.3 (136 g) | 0.3 (136 g) |
| AQUACOL-S, % | — | — | — | — | — | 2.5 | — | — | 2.5 | 2.5 | — | — | — | — |
| TPGB, % | — | — | — | — | — | — | 2.5 | 2.5 | — | — | — | — | — | — |
| Product I.D. No. 1353, % | — | — | — | — | — | — | — | — | — | — | 2.5 | 1.5 | 3.0 | 2.5 |
| Caustic soda, lb | — | — | — | — | — | — | — | — | — | — | 1 (454 g) | 1 (454 g) | 1 (454 g) | 1 (454 g) |
| Stirred on Prince Castle at 5000 rpm, 45 min. | | | | | | | | | | | | | | |
| Properties | | | | | | | | | | | | | | |
| θ600 at 80° F. (27° C.) | 44 | 36 | 62 | 62 | 29 | 35 | 27 | 97 | 23 | 24 | 79 | 12 | 44 | 70 |
| θ300 | 26 | 20 | 41 | 40 | 18 | 21 | 15 | 64 | 12 | 13 | 48 | 6 | 25 | 41 |
| θ200 | 19 | 15 | 32 | 30 | 14 | 16 | 11 | 50 | 8 | 8 | 36 | 3 | 17 | 30 |
| θ100 | 12 | 9 | 22 | 21 | 8 | 11 | 6 | 31 | 4 | 4 | 22 | 2 | 10 | 19 |
| θ6 | 4 | 3 | 13 | 10 | 3 | 4 | 1 | 10 | 0 | 1 | 7 | 0 | 2 | 8 |
| θ3 | 3 | 2 | 12 | 10 | 2 | 4 | 0 | 9 | 0 | 0 | 5 | 0 | 1 | 7 |
| Plastic Viscosity, cp | 18 | 16 | 21 | 22 | 11 | 14 | 12 | 31 | 11 | 11 | 31 | 6 | 19 | 29 |
| Yield Point, lb/100 sq ft | 8 (3.83 N/m$^2$) | 4 (1.92 N/m$^2$) | 20 (9.58 N/m$^2$) | 18 (8.62 N/m$^2$) | 7 (3.35 N/m$^2$) | 7 (3.35 N/m$^2$) | 3 (1.44 N/m$^2$) | 33 (15.8 N/m$^2$) | 1 (0.48 N/m$^2$) | 2 (0.96 N/m$^2$) | 17 (8.14 N/m$^2$) | 0 | 6 (2.87 N/m$^2$) | 12 (5.75 N/m$^2$) |
| 10-sec Gel, lb/100 sq ft | 5 (2.39 N/m$^2$) | 4 (1.92 N/m$^2$) | 14 (6.70 N/m$^2$) | 13 (6.22 N/m$^2$) | 3 (1.44 N/m$^2$) | 6 (2.87 N/m$^2$) | 1 (0.48 N/m$^2$) | 15 (7.18 N/m$^2$) | 0 | 1 (0.48 N/m$^2$) | 19 (9.10 N/m$^2$) | 0 | 4 (1.92 N/m$^2$) | 16 (7.66 N/m$^2$) |
| 10-min Gel, lb/100 sq ft | 6 (2.87 N/m$^2$) | 5 (2.39 N/m$^2$) | 18 (8.62 N/m$^2$) | 16 (7.66 N/m$^2$) | 4 (1.92 N/m$^2$) | 28 (13.4 N/m$^2$) | 11 (5.27 N/m$^2$) | 28 (13.4 N/m$^2$) | 1 (0.48 N/m$^2$) | 2 (0.96 N/m$^2$) | 51 (24.4 N/m$^2$) | 0 | 15 (7.18 N/m$^2$) | 29 (13.9 N/m$^2$) |

*pretreated brine
**heat-aged 2 hr at 150° F. (66° C.)

DATA TABLE II

Gravel Pack Structured Fluid Study in CaCl$_2$/CaBr$_2$

| Materials | I | K | L | M | N | O | P | Z | AA | AB |
|---|---|---|---|---|---|---|---|---|---|---|
| 13.0 lb/gal (1,560 kg/m$^3$) CaCl$_2$/CaBr$_2$ | 0.965 (153 1) | 0.955 (152 1) | — | — | — | — | — | — | — | — |
| 13.5 lb/gal (1,620 kg/m$^3$) CaCl$_2$/CaBr$_2$ | — | — | 0.94 (149 1) | 0.94 (149 1) | 0.94 (149 1) | 0.955 (152 1) | 0.95 (151 1) | 0.94 (149 1) | 0.95 (151 1) | 0.95 (151 1) |
| DFE-705% | — | 3.5 | — | — | — | — | — | 2.0 | 2.0 | 1.0 |
| EXP-42, % | 2.5 | — | 3.0 | 5 | 3.0 | 1.5 | 2.0 | — | — | — |
| Product I.D. No. 1889, lb | 0.1 (45.4 g) | 0.1 (45.4 g) | — | — | — | — | — | — | — | — |
| LD-8, lb | — | — | 0.2 (90.8 g) | 0.2 (90.8 g) | — | — | — | 0.5 (227 g) | 0.5 (227 g) | 0.5 (227 g) |
| AQUACOL-S, % | 1.0 | 1.0 | — | — | — | — | — | — | — | — |
| UCON 75H-450, % | — | — | 3.0 | 1.0 | — | — | — | — | — | — |
| Product I.D. No. 1353, % | — | — | — | — | 3.0 | 3.0 | 2.0 | 4.0 | 3.0 | 4.0 |
| Caustic soda, lb | — | — | — | — | 1 (454 g) | 0.5 (227 g) | 0.5 (227 g) | 1 (454 g) | 1 (454 g) | 1 (454 g) |

Stirred on Prince Castle at 5000 rpm, 45 min.

Properties

| Materials | I | K | L | M | N | O | P | Z | AA | AB |
|---|---|---|---|---|---|---|---|---|---|---|
| θ600 at 80° F. (27° C.) | 77 | 68 | 92 | 80 | 180 | 95 | 70 | 165 | 109 | 44 |
| θ300 | 47 | 40 | 54 | 47 | 120 | 58 | 40 | 105 | 64 | 23 |
| θ200 | 33 | 29 | 38 | 34 | 97 | 44 | 29 | 81 | 47 | 15 |
| θ100 | 20 | 18 | 23 | 20 | 65 | 28 | 18 | 55 | 29 | 8 |
| θ6 | 5 | 5 | 5 | 5 | 47 | 12 | 5 | 32 | 11 | 1 |
| θ3 | 5 | 5 | 4 | 4 | 46 | 10 | 4 | 30 | 10 | 0 |
| Plastic Viscosity, cp | 30 | 28 | 38 | 22 | 60 | 37 | 30 | 60 | 45 | 21 |
| Yield Point, lb/100 sq ft | 17 (8.14 N/m$^2$) | 12 (5.75 N/m$^2$) | 16 (7.66 N/m$^2$) | 18 (8.62 N/m$^2$) | 60 (28.7 N/m$^2$) | 21 (10.1 N/m$^2$) | 10 (4.79 N/m$^2$) | 45 (21.5 N/m$^2$) | 19 (9.10 N/m$^2$) | 2 (0.96 N/m$^2$) |
| 10-sec Gel, lb/100 sq ft | 5 (2.39 N/m$^2$) | 6 (2.87 N/m$^2$) | 5 (2.39 N/m$^2$) | 13 (6.22 N/m$^2$) | 67 (32.1 N/m$^2$) | 18 (8.62 N/m$^2$) | 6 (2.87 N/m$^2$) | 41 (19.6 N/m$^2$) | 14 (6.70 N/m$^2$) | 1 (0.48 N/m$^2$) |
| 10-min Gel, lb/100 sq ft | 7 (3.35 N/m$^2$) | 8 (3.83 N/m$^2$) | 8 (3.83 N/m$^2$) | 16 (7.66 N/m$^2$) | 75 (35.9 N/m$^2$) | 29 (13.9 N/m$^2$) | 7 (3.35 N/m$^2$) | 70 (33.5 N/m$^2$) | 28 (13.4 N/m$^2$) | 5 (2.39 N/m$^2$) |

DATA TABLE III

Gravel Pack Structured Fluid Study in 11.7 lb/gal (1.400 kg/m$^3$) NaBr

| Materials: | U | V | W | X | Y |
|---|---|---|---|---|---|
| 11.7 lb/gal (1,400 kg/m$^3$) NaBr, bbl | 0.95 (151 1) | 0.925 (147 1) | 0.95 (151 1) | 0.93 (148 1) | 0.90 (143 1) |
| EXP-42, % | 2.5 | 2.5 | 3.0 | — | — |
| LD-8, lb | 1.0 (454 g) | 1.0 (454 g) | — | — | — |
| AQUACOL-S, % | — | 2.5 | — | 2.0 | 2.0 |
| Product I.D. No. 1353, % | 2.5 | 2.5 | 5.0 | 5.0 | 10 |
| Caustic soda, lb | 1.0 (454 g) | 1.0 (454 g) | 1.5 (681 g) | 1.5 (681 g) | 2.0 (908 g) |

Stirred on Prince Castle at 5000 rpm, 45 min.

Properties

| | U | V | W | X | Y |
|---|---|---|---|---|---|
| θ600@80° F. (27° C.) | * | * | ** | 18 | 26 |
| θ300 | | | | 12 | 18 |
| θ200 | | | | 9 | 14 |
| θ100 | | | | 7 | 11 |
| θ6 | | | | 4 | 6 |
| θ3 | | | | 4 | 6 |
| Plastic Viscosity, cp | | | | 6 | 8 |
| Yield Point, lb/100 sq ft | | | | 6 (2.87 N/m$^2$) | 10 (4.79 N/m$^2$) |

DATA TABLE III-continued

Gravel Pack Structured Fluid Study in 11.7 lb/gal (1.400 kg/m³) NaBr

| Materials: | U | V | W | X | Y |
|---|---|---|---|---|---|
| 10-sec Gel, lb/100 sq ft | | | | 5 (2.39 N/m²) | 8 (3.83 N/m²) |
| 10-min Gel, lb/100 sq ft | | | | 7 (3.35 N/m²) | 8 (3.83 N/m²) |

*very severe foaming
**water-like, no gel structure

Settling Tests

Next, candidates were screened for settling. Gravel suspending tests were run using 13.5 ppg (1,620 kg/m³) calcium chloride/calcium bromide and 11.6 ppg (1,390 kg/m³) calcium chloride. Both fluids contain the following ingredients per lab barrel:

| | |
|---|---|
| 2.0% | EXP42 |
| 2.5% | SUMMACHLOR 50 |
| 1.0 lb | Caustic soda |
| 0.3 lb | LD-8 |

13.5 ppg (1.620 kg/m³) Calcium chloride/calcium bromide system—Fluid "O"

The required volume of brine for two lab barrels were measured out and 15 ppg (1,800 kg/m³) of 40–60 U.S. mesh gravel were added to each. By vigorously shaking each glass container, the gravel was mixed within the fluid and suspended. One lab barrel of the 13.5 ppg (1,620 kg/m³) brine containing 15 ppg (1,800 kg/m³) 40–60 gravel was placed in an oven at 150° F. (66° C.) and the other sample was left on the lab bench at room temperature. Both samples were observed daily to see if gravel was settling out and inverted to see if the gravel was still flowable. Flowable was defined as when the container was inverted, the slurry flowed within.

The sample tested at 150° F. (66° C.) was left in the oven for 8 days except when the sample was removed from the oven for observation each day. All gravel settled out and packed on the bottom of the jar at the end of the eighth day. The room temperature sample was checked at 20 days. Some gravel, about ¼" (0.635 cm) deep, had settled to the bottom of the container, but the slurry was still flowable.

11.6 ppg (1.390 kg/m³) Calcium chloride system—Fluid "T"

Two lab barrels of 11.6 ppg (1,390 kg/m³) CaCl₂ were prepared and 15 ppg (1,800 kg/m³) of 40–60 U.S. mesh gravel was added to each. One of the slurries was placed in the 150° F. (66° C.) oven and checked daily. This sample remained flowable for 8 days before being removed from the oven. The second sample was checked at 20 days. Some gravel, about ¼" (0.635 cm) deep, had settled to the bottom of the container, but the remainder of the slurry was still flowable.

Return Permeability Tests

A sandpack return permeameter was used to test the effect on return permeability of exposure of the PERFFLOW® filter cake to brine used to dilute the slurry concentrates prepared above. FIG. 1 provides a schematic of return permeability testing. After establishing a base permeability to oil, the cell was opened, the 40–60 gravel dug out, and PERFFLOW® added to fill the space above the 140–270 sand. Next, the cell was reassembled and placed into a heating jacket where it was warmed to 150° F. (66° C.). Mudoff for two hours at 500 psi (3,450 kPa) was conducted once the cell reached test temperature. Leakoff data was collected during the mudoff period.

After mudoff, the cell was removed from the holder to the laboratory vise where it was opened, and the PERFFLOW® poured off. Next, the cell was filled with brine containing the slurry concentrates of the invention equal to a 15:1 dilution. This simulated the completion fluid after the slurry concentrates of Fluids "O" and "T" were injected therein. This brine was stirred carefully to prevent damage to the filter cake and then poured off. The cell was filled again with brine. Next, fresh gravel is poured through the brine, the cell is sealed, and returned to the heating jacket. Additional test brine is placed into a hoke cylinder fixed to the top of the cell. Test brine was injected against the existing filter cake for 2 hours. Leakoff was recorded at the end of the injection.

Upon completion of brine injection, the hoke cylinder was removed, the cell removed from the heating jacket, and cooled to room temperature. Final permeability was determined. Sandpack return permeability data is summarized below in Table IV. Excellent results of 100.0% and 110.8% were achieved with inventive Fluids "O" and "T", respectively.

TABLE IV

Sandpack Return Permeability Data

| Fluid: | | 11.0 ppg (1,320 kg/m³) CaCl₂ PERFFLOW DIF | | |
|---|---|---|---|---|
| Bridging on: | | ¼" (0.625 cm) 10 micron Aloxite disk/5" (12.7 cm) 140/270 sand | | |
| Returning through: | | 1" (2.54 cm) 40/60 gravel, 0.006 gauge Bakerweld screen | | |
| Temperature | | 150° F. (66° C.) | | |
| Mudoff Pressure/Time | | 500 psi (3,450 kPa)/1 hr | | |
| Fluid: | Base Run, no brine | Base Run, Mudoff 2 hours with PERF-FLOW.Displace whole PERF-FLOW with 11.0 ppg (1,320 kg/m³) CaCl₂ brine. | 11.0 ppg (1,320 kg/m³) CaCl₂ brine + 15:1 Fluid "O" (13.5 ppg (1,620 kg/m³) CaCl₂/CaBr₂) | 11.0 ppg (1,320 kg/m³) CaCl₂ brine + 15:1 Fluid "T" (11.6 ppg (1,390 kg/m³) CaCl₂) |
| Return Permeability: | 107.4% | 104.3% | 100.0% | 110.8% |

In the foregoing specification, the invention has been described with reference to specific embodiments thereof, and has been demonstrated as effective in providing a pumpable, viscoelastic slurry concentrate which can effectively carry solid particles. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, surfactants and alkaline agents with aluminum chlorohydrate falling within the claimed parameters, but not specifically identified or tried in a particular composition to improve the delivery of solids herein, are anticipated to be within the scope of this invention.

GLOSSARY

| | |
|---|---|
| AQUACOL-S | Ethoxylated/propoxylated glycol. |
| DFE-705 | Ethoxylated castor oil. |
| EXP-42 | Ethoxylated oleyl alcohol surfactant available from Rhodia Corp., Cranbury, New Jersey. |
| LD-8 | A defoamer available from Baker Hughes INTEQ, Houston, Texas. |
| PERFFLOW ® | Drilling completion fluid available from Baker Hughes INTEQ. |
| Product I.D. No. 1353 | SUMMACHLOR 50 aluminum chlorohydrate, available from Summit Research Labs, Somerset, New Jersey. |
| Product I.D. No. 1889 | BEVALOID 6092 defoamer available from Rhodia Corp., Cranbury, New Jersey. |
| MO-2675 | Ethoxylated tall oil available from Baker Petrolite Corporation. |
| SUMMACHLOR 50 | Aluminum chlorohydrate available from Summit Research Labs, Somerset, New Jersey. |
| TPGB | Tripropylene glycol bottoms available from Dow Chemical, Freeport, Texas. |
| UCON 75H-450 | Ethoxylated/propoxylated glycol available from Union Carbide. |

We claim:

1. A slurry concentrate for carrying solid particles comprising:
   brine base fluid;
   aluminum chlorohydrate as a viscosifying agent;
   a surfactant; and
   an alkaline agent in an amount effective to initiate viscosifying, wherein said slurry concentrate does not contain a thickening or viscosifying polymer.

2. The slurry concentrate of claim 1 where the proportion of
   the aluminum chlorohydrate ranges from about 0.1 to 90 volume %;
   the surfactant ranges from about 0.1 to 50 volume %; and
   the brine base fluid and the alkaline agent make up the balance.

3. The slurry concentrate of claim 1 where the surfactant is selected from the group consisting of alkoxylated fatty alcohols and alkoxylated fatty oils.

4. The slurry concentrate of claim 1 further comprising solid particles to be transported.

5. The slurry concentrate of claim 1 further comprising solid particles where the proportion of solid particles ranges from 0.1 to 26 pounds per gallon of slurry concentrate.

6. The slurry concentrate of claim 1 where viscoelasticity is broken by a mechanism selected from the group consisting of dilution, pH adjustment, pressure adjustment, temperature adjustment, catalytic agent and reactive agent.

7. A completion fluid comprising
   a slurry concentrate for carrying solids comprising:
      brine base fluid;
      aluminum chlorohydrate as a viscosifying agent;
      a surfactant; and
      an alkaline agent in an amount effective to initiate viscosifying;
   sufficient additional brine to dilute the slurry concentrate to reduce its viscosity, wherein said slurry concentrate does not contain a thickening or viscosifying polymer.

8. The completion fluid of claim 7 where in the slurry concentrate, the proportion of
   the aluminum chlorohydrate ranges from about 0.1 to 90 volume %;
   the surfactant ranges from about 0.1 to 50 volume %; and
   the brine base fluid and the alkaline agent make up the balance.

9. The completion fluid of claim 7 where the surfactant is selected from the group consisting of alkoxylated fatty alcohols and alkoxylated fatty oils.

10. A method for transporting solid particles comprising:
    providing a slurry concentrate for carrying solid particles comprising:
       brine base fluid;
       aluminum chlorohydrate as a viscosifying agent;
       a surfactant selected from the group consisting of alkoxylated fatty alcohols and alkoxylated fatty oils; and
       an alkaline agent in an amount effective to initiate viscosifying; wherein said slurry concentrate does not contain a thickening or viscosifying polymer;
    adding solid particles to the slurry concentrate;
    providing a conduit containing flowing brine; and
    injecting the slurry concentrate into the flowing brine.

11. The method of claim 10 where injecting the slurry concentrate into the flowing brine is accomplished using a pump.

12. The method of claim 10 where in providing a conduit containing flowing brine, the brine is flowing through the conduit by force of a pump.

13. The method of claim 10 where in providing the slurry concentrate, the proportion of
    the aluminum chlorohydrate ranges from about 0.1 to 90 volume %;
    the surfactant ranges from about 0.1 to 50 volume %; and
    the brine base fluid and the alkaline agent make up the balance.

14. The method of claim 10 where in providing the slurry concentrate, the surfactant is selected from the group consisting of ethoxylated fatty alcohols and ethoxylated fatty oils.

15. The method of claim 10 where in adding solid particles, the proportion of solid particles in the slurry concentrate ranges from 0.1 to 18 pounds per gallon of slurry concentrate.

16. The method of claim 10 further comprising:
    transporting the brine containing solid particles into a subterranean formation.

17. The method of claim 10 further comprising:
    breaking the viscoelasticity of the slurry concentrate by a mechanism selected from the group consisting of dilution, pH adjustment, pressure adjustment, temperature adjustment, catalytic agent and reactive agent.

* * * * *